(12) United States Patent
Shimada et al.

(10) Patent No.: US 6,965,444 B1
(45) Date of Patent: Nov. 15, 2005

(54) IMAGE OUTPUT METHOD AND SYSTEM FOR DISTRIBUTING IMAGE OUTPUT

(75) Inventors: Takamitsu Shimada, Yokohama (JP); Miki Konno, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 910 days.

(21) Appl. No.: 09/665,173

(22) Filed: Sep. 19, 2000

(51) Int. Cl.⁷ .................... G06K 15/00; G06K 15/02
(52) U.S. Cl. ............... 358/1.15; 358/1.13; 399/410; 709/201
(58) Field of Search .................. 358/1.11–1.18, 358/296; 399/82, 410; 709/201; 412/18

(56) References Cited

U.S. PATENT DOCUMENTS

| | | | | |
|---|---|---|---|---|
| 5,596,416 A | * | 1/1997 | Barry et al. | 358/296 |
| 5,859,711 A | * | 1/1999 | Barry et al. | 358/296 |
| 6,041,200 A | * | 3/2000 | Glass et al. | 399/82 |
| 2001/0048533 A1 | * | 12/2001 | Koana | 358/1.15 |

FOREIGN PATENT DOCUMENTS

| | | | | |
|---|---|---|---|---|
| JP | 10-126547 A | | 5/1998 | |
| JP | 10126547 A | * | 5/1998 | ............ H04N 1/00 |
| JP | 11-327376 | | 11/1999 | .......... G03G 21/00 |

* cited by examiner

Primary Examiner—King Y. Poon
(74) Attorney, Agent, or Firm—Foley & Lardner LLP

(57) ABSTRACT

Where monochromatic pages (image data of monochromatic originals) and color pages (image data of color originals) are mixed in a print job received from a personal computer via a network includes and a distribution mode is set, a printer controller controls printing by distributing the monochromatic pages to a monochromatic image forming apparatus and the color pages to a color image forming apparatus. If the printing of the color pages by the color image forming apparatus is completed but the printing of the monochromatic pages is not completed, the mode of the color image forming apparatus is switched to a monochromatic mode and the printing of the monochromatic pages is distributed in accordance with the printing speeds (monochromatic printing) of the color image forming apparatus switched to the monochromatic mode and the monochromatic image forming apparatus.

7 Claims, 7 Drawing Sheets

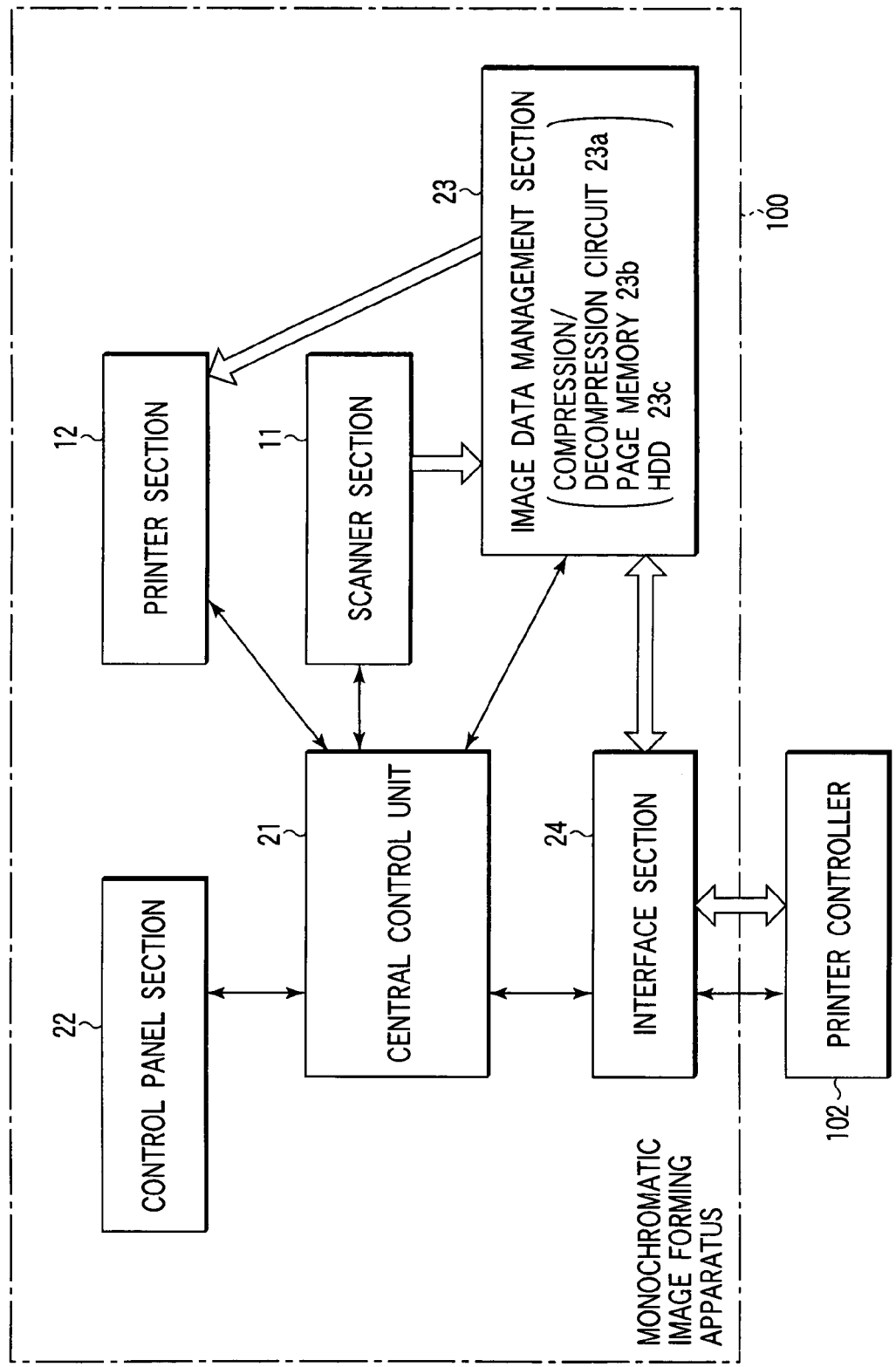
F I G. 2

103

| SHEET SIZE | A4 | ☑ DISTRIBUTIVE PRINTING |
| NUMBER OF COPIES | 2 | ☐ HIGH-SPEED PRINTING |
| SORT MODE | SORT | ☑ OUTPUT DESTINATION DISPLAY |
| PRIORITY | HIGH | ☑ OUTPUT DESTINATION PRINTING |

PRINTER

| | PRINTER NAME | PPM (BLACK/COLOR) | STATUS |
|---|---|---|---|
| ☑ | COLOR PRINTER 1 | 40/20 | IDLE |
| ☑ | MONO PRINTER 1 | 60/-- | IDLE |
| ☐ | MONO PRINTER 2 | 60/-- | PRINTING |

ESTIMATE PRINT TIME : 4 MIN.

FIG. 5

PRINT JOB NAME : SAMPLE.DOC
POSSESSOR : ADMINISTRATOR
REQUIRED PRINT TIME : 5 : 03

| NUMBER OF COPIES | PAGES | NUMBER OF PAGES | MONOCHROMATIC/ COLOR | OUTPUT PRINTER |
|---|---|---|---|---|
| 1 | 1~30 | 30 | MONOCHROMATIC | MONO PRINTER 1 |
| 1 | 31~35 | 5 | COLOR | COLOR PRINTER 1 |
| 1 | 36~50 | 15 | MONOCHROMATIC | COLOR PRINTER 1 |
| 2 | 1~30 | 30 | MONOCHROMATIC | MONO PRINTER 1 |
| | : | | | |

FIG. 8

IMAGE OUTPUT METHOD AND SYSTEM FOR DISTRIBUTING IMAGE OUTPUT

BACKGROUND OF THE INVENTION

The present invention relates to an image output system and an image output method for outputting a monochromatic image and a color image where at least one monochromatic image output apparatus and color image output apparatus are connected in tandem.

According to prior art, a plurality of output apparatuses such as a printer and a copying machine are connected to a network, and images can be output via a computer. A system user performs an output operation using one printer designated in advance. Image data of a color original is printed out by a selected color printer connected to the network.

Image data of an office use original, for instance, contains several % of image data of a color original (including office multi-color data of graphs, etc., in addition to full color data of photographs, etc.). In general, where image data including image data of a color original is to be printed, the speed of color printing is considerably lower than that of monochromatic printing, and the cost is higher. Thus, it is not practical to print all data in color.

In order to solve this problem, Jpn. Pat. Appln. KOKAI Publication No. 11-327376, for example, discloses that where image data including image data of a color original is to be printed, it is determined whether the image data is that of a color original or that of a monochromatic original. If the image data is that of a monochromatic original, monochromatic image printing is carried out by selecting a monochromatic image output apparatus. If the image data is that of a color original, color image printing is carried out by selecting a color image output apparatus.

However, where image data of a monochromatic original is printed by the monochromatic image output apparatus and image data of a color original is printed by the color image output apparatus, if several % of color original image data is included, the color printing may be completed earlier although the speed of color printing is much lower than that of monochromatic printing. In this case, it is necessary to wait for completion of monochromatic printing. Thus, if the output apparatuses are specified such that image data of a monochromatic original is printed by the monochromatic image output apparatus and image data of a color original is printed by the color image output apparatus, the time needed for printing all image data increases and the printing efficiency deteriorates.

BRIEF SUMMARY OF THE INVENTION

The object of the present invention is to provide an image output system and an image output method capable of efficiently printing image data of a monochromatic original and image data of a color original, where image data including color original image data is to be printed.

In order to achieve the object, there is provided an image output system in which a first output apparatus for outputting a monochromatic image, a second output apparatus for outputting a color image, and a controller for controlling image outputs of the output apparatuses are connected, wherein the controller comprises: reception means for receiving a print job; first control means for controlling image outputs by distributing monochromatic pages to the first output apparatus and color pages to the second output apparatus where the monochromatic pages and color pages are mixed in the print job received by the reception means; and second control means for controlling image outputs by switching an output mode of the second output apparatus to a monochromatic image output mode when the image output of the color pages from the second output apparatus has been completed by the control of the first control means, and distributing non-output monochromatic pages to the second output apparatus switched to the monochromatic image output mode and to the first output apparatus.

According to this invention, there is also provided an image output system in which a controller that is connected to a plurality of output apparatuses including an output apparatus for outputting a monochromatic image and an output apparatus for outputting a color image and controls image outputs thereof is connected to a personal computer via a communication line, wherein the controller comprises: reception means for receiving a print job from the personal computer via the communication line; first control means for controlling image outputs by distributing monochromatic pages to one or more of the output apparatuses for outputting monochromatic images and color pages to one or more of the output apparatuses for outputting color images where the monochromatic pages and color pages are mixed in the print job received by the reception means; and second control means for controlling image outputs by switching an output mode of the one or more output apparatuses for outputting color images to a monochromatic image output mode when the image output of the color pages has been completed by the control of the first control means, and distributing remaining monochromatic pages to the one or more output apparatuses switched to the monochromatic image output mode and to the one or more output apparatuses for outputting monochromatic images in accordance with output speeds of the output apparatuses.

According to this invention, there is also provided an image output method for outputting images using a plurality of image forming apparatuses connected to a network, the method comprising: a step of instructing output of plural images; a first distribution step of distributing images to be output to the plural image forming apparatuses in accordance with contents of the plural images the output of which has been instructed; and a second distribution step of redistributing non-output images to the plurality of image forming apparatus, where any one of the plural image forming apparatuses has completed the output of the images distributed in the distribution step and there are the non-output images in the images distributed to the other image forming apparatuses in the distribution step.

BRIEF DESCRIPTION OF THE SEVERAL VIEWS OF THE DRAWING

FIG. 2 schematically shows a structure of a monochromatic image forming apparatus;

FIG. 5 shows an example of a print setting screen of a personal computer;

FIG. 8 shows an example of a print result table printed or displayed;

DETAILED DESCRIPTION OF THE INVENTION

An embodiment of the present invention will now be described with reference to the accompanying drawings.

Figure 1:
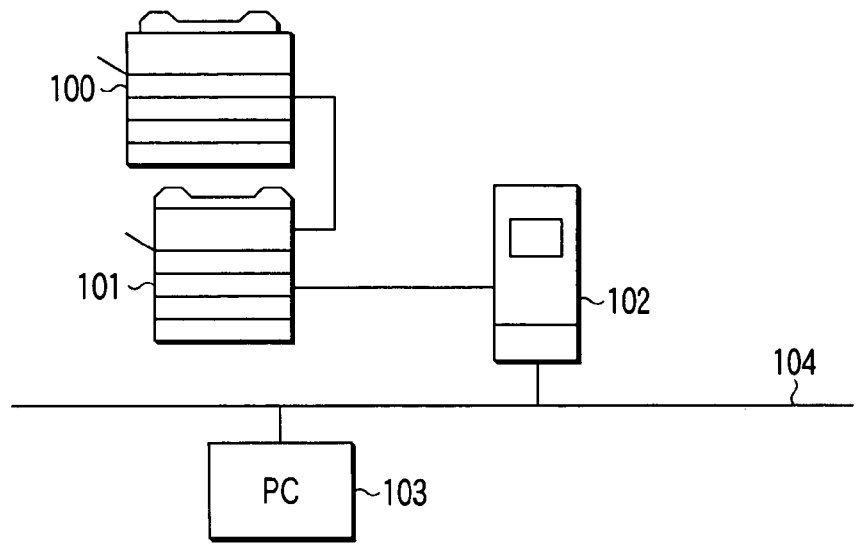
FIG. 1 is a block diagram showing a structure of an image output system according to the present invention.

FIG. 1 shows a structure of an image output system according to the present invention. Specifically, in the image output system, at least one monochromatic image forming apparatus 100 and at least one color image forming apparatus 101 employed as image output apparatuses are connected to one printer controller 102.

The monochromatic image forming apparatus 100, color image forming apparatus 101 and printer controller 102 are connected by SCSI (small computer system interface) or IEEE (Institute of Electrical and Electronic Engineers) 1394.

The printer controller 102 is connected to a network 104. At least one personal computer 103 is connected to the network 104.

FIG. 2 schematically shows the structure of the monochromatic image forming apparatus 100. The monochromatic image forming apparatus 100 comprises a central control unit 21 for control of the entirety; a control panel section 22 serving as an input/output interface with a user; a printer section 12 for effecting printing on paper sheets; a scanner section 11 for reading originals; an image data management section 23 having a memory means for compressing/decompressing and storing image data; and an interface section 24 for communication with the printer controller 102.

The image data management section 23 comprises a compression/decompression circuit 23a for compressing/decompressing image data; a page memory 23b for storing image data in units of a page; and a hard disk drive (HDD) 23c for storing image data.

The central control unit 21, control panel section 22, image data management section 23, interface section 24, scanner section 11 and printer section 12 of the monochromatic image forming apparatus 100 are connected by a control interface. The control interface is denoted by single-line arrows in the figure. The central control section 21 controls and synchronizes the scanner section 11, printer section 12, control panel section 22, image data management section 23 and interface section 24, thereby realizing the respective functions of the monochromatic image forming apparatus 100.

The scanner section 11, printer section 12, central control unit 21, image data management section 23 and interface section 24 are connected by image data interface. The image data interface is denoted by white-line arrows in the figure. Image data is transmitted among the scanner section 11, printer section 12 and interface section 24, with the image data management section 23 functioning as a hub.

The monochromatic image forming apparatus 100 is connected to the printer controller 102 via the interface section 24. Image data can be received from the printer controller 102 or sent to the printer controller 102.

The printer controller 102 can read status data of the monochromatic image forming apparatus 100 via the interface section 24, and can control the central control unit 21 and control panel section 22 via the interface section 24.

Figure 3:
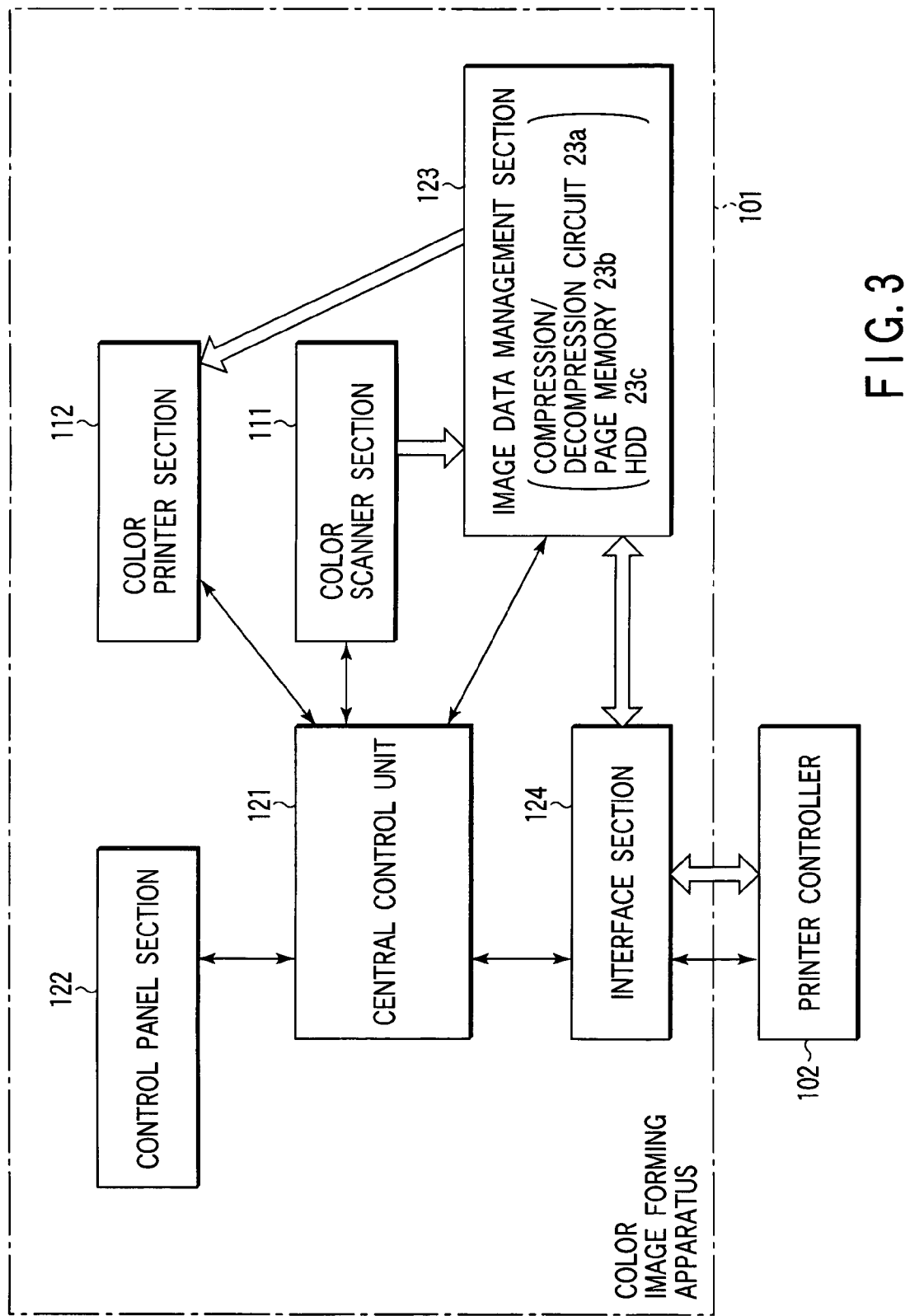
FIG. 3 schematically shows a structure of a color image forming apparatus.

FIG. 3 schematically shows the structure of the color image forming apparatus 101. The color image forming apparatus 101 comprises a central control unit 121 for control of the entirety; a control panel section 122 serving as an input/output interface with a user; a color printer section 112 for effecting printing on paper sheets; a color scanner section 111 for reading originals; an image data management section 123 having a memory means for compressing/decompressing and storing image data; and an interface section 124 for communication with the printer controller 102.

The image data management section 123 comprises a compression/decompression circuit 123a for compressing/decompressing image data; a page memory 123b for storing image data in units of a page; and a hard disk drive (HDD) 123c for storing image data.

The central control unit 121, control panel section 122, image data management section 123, interface section 124, color scanner section 111 and color printer section 112 of the color image forming apparatus 101 are connected by a control interface. The control interface is denoted by single-line arrows in the figure. The central control section 121 controls and synchronizes the color scanner section 111, color printer section 112, control panel section 122, image data management section 123 and interface section 124, thereby realizing the respective functions of the color image forming apparatus 101.

The color scanner section 111, color printer section 112, central control unit 121, image data management section 123 and interface section 124 are connected by image data interface. The image data interface is denoted by white-line arrows in the figure. Image data is transmitted among the color scanner section 111, color printer section 112 and interface section 124, with the image data management section 123 functioning as a hub.

The color image forming apparatus 101 is connected to the printer controller 102 via the interface section 124. Image data can be received from the printer controller 102 or sent to the printer controller 102.

The printer controller 102 can read status data of the color image forming apparatus 101 via the interface section 124, and can control the central control unit 121 and control panel section 122 via the interface section 124. Thereby, the printer controller 102 may cause the color image forming apparatus 101 to effect monochromatic image formation (monochromatic mode).

Figure 4:
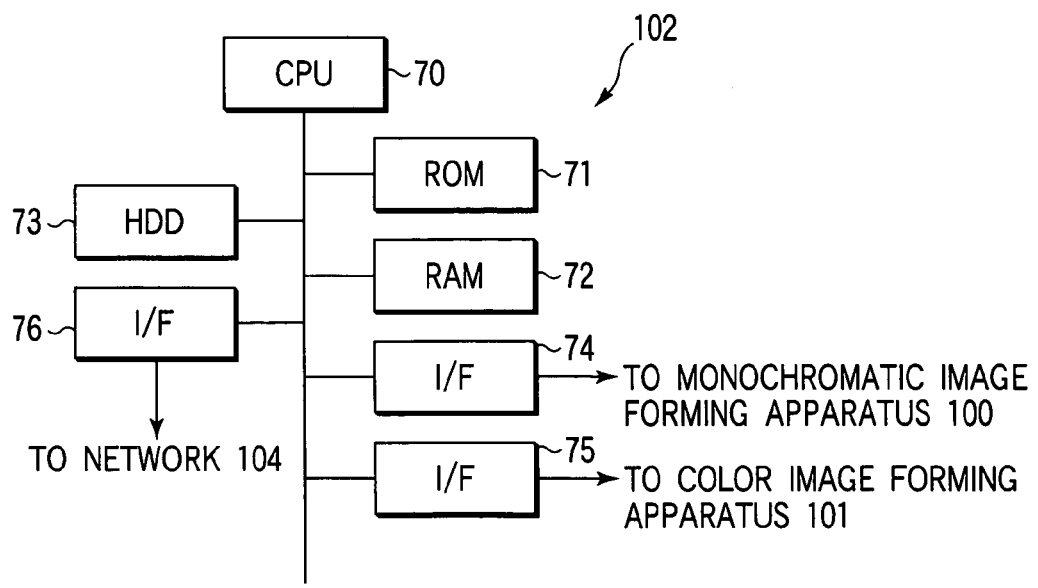
FIG. 4 schematically shows a structure of a printer controller.

FIG. 4 schematically shows the structure of the printer controller 102. The printer controller 102 comprises a CPU 70 for control of the entirety; a ROM 71 storing control programs; a RAM 72 for temporarily storing data; a hard disk drive (HDD) 73 for storing image data; an interface 74 connected to the monochromatic image forming apparatus 100; an interface 75 connected to the color image forming apparatus 101; and an interface 76 connected to the network 104.

FIG. 5 shows an example of a print setting screen of the personal computer 103 for sending a print job to the printer controller 102 via the network 104. On the print setting screen of the personal computer 103 shown in FIG. 5, a sheet size, the number of copies, sort mode, priority, etc. are set. In addition, various modes in the present invention, such as "distributive printing", "high-speed printing", "output destination display" and "output destination printing", are set. Furthermore, the printers (including an image output apparatus and an image forming apparatus) can be designated. It is also possible to display an approximate print time of a set print job, on the basis of the processing performance of the selected printer.

In the distributive printing mode, printing is effected such that a monochromatic page (image data of a monochromatic original) is sorted to the monochromatic image forming apparatus 100 and a color page (image data of a color original) is sorted to the color image forming apparatus 101. Hereinafter, this mode is referred to as "distribution mode."

In the high-speed printing mode, the total printing time is decreased by parallel printing, using all available image forming apparatuses.

In the output destination display mode, when the print job based on the set mode is completed, the screen of the personal computer 103 displays a print result table showing which page is printed by which image forming apparatus.

In the output destination printing mode, when the print job based on the set mode is completed, the image forming apparatus prints out a print result table showing which page is printed by which image forming apparatus.

Figure 6:
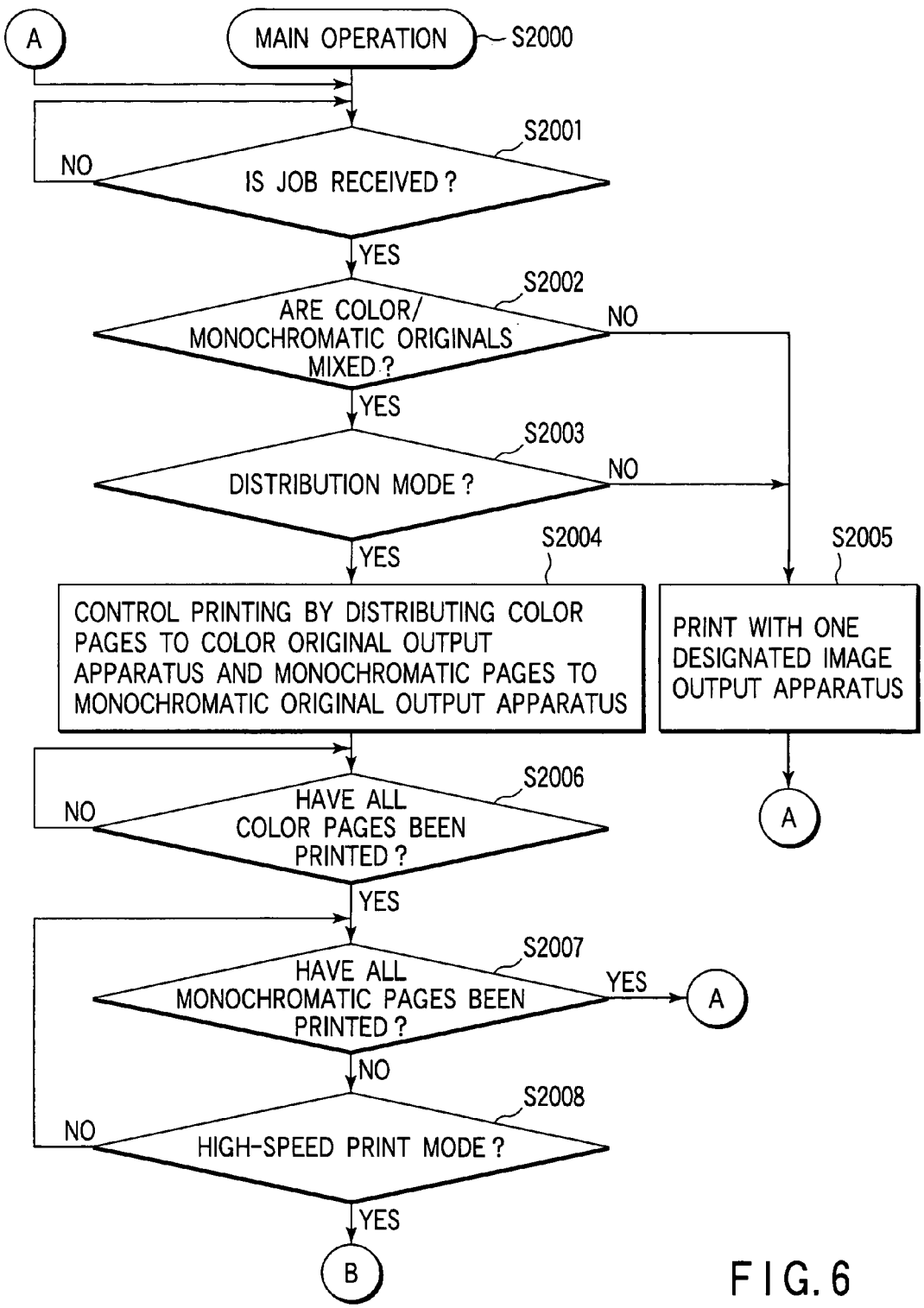
FIG. 6 is a flow chart illustrating the operation of an image output system.
Figure 7:
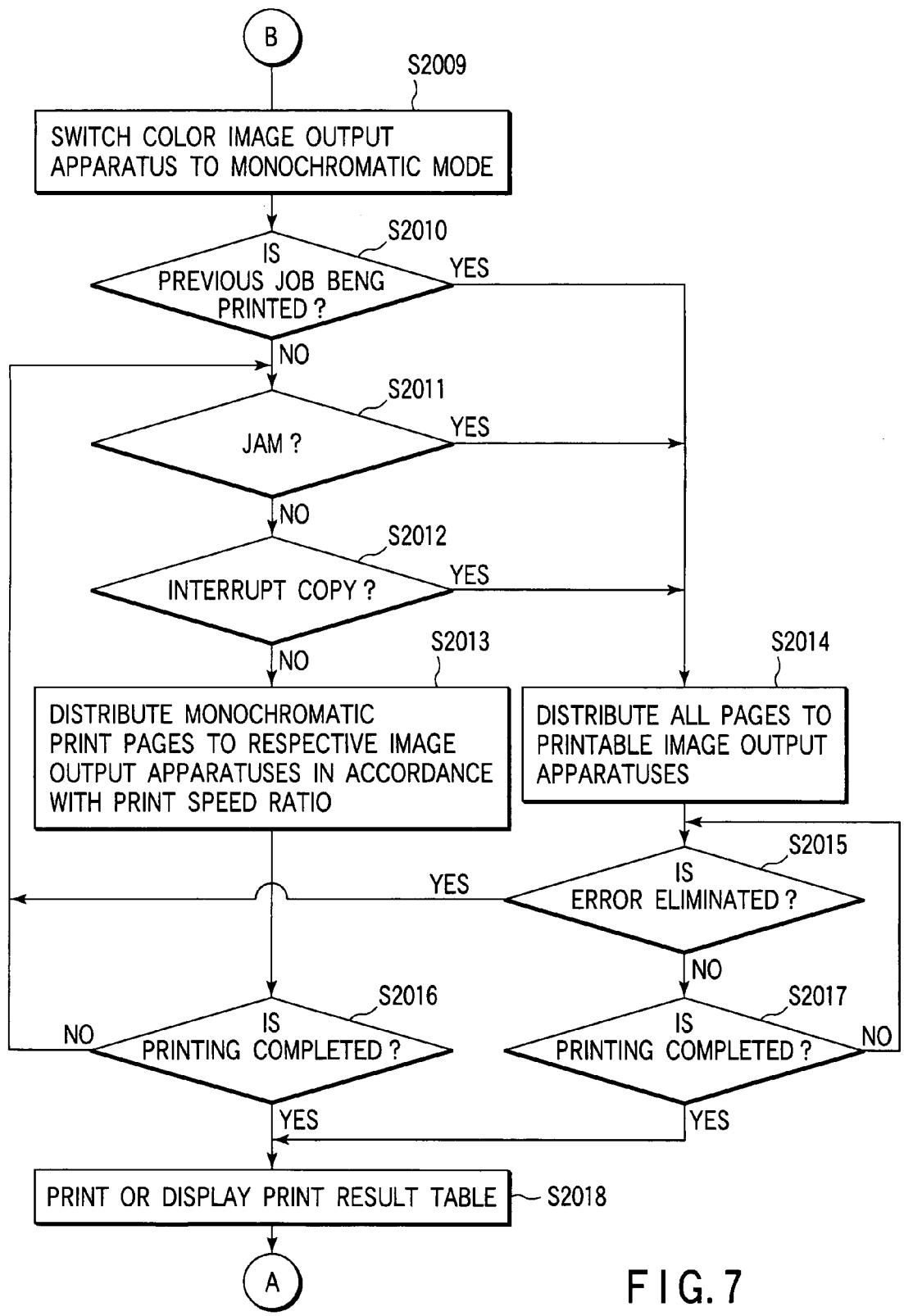
FIG. 7 is a flow chart illustrating the operation of the image output system.

The operation of the image output system with the above structure will now be described with reference to flow charts of FIGS. 6 and 7.

The CPU 70 of the printer controller 102 waits until it receives a print job (S2001).

When the printer controller 102 has received the print job from the personal computer 103 via the network 104, the CPU 70 of the printer controller 102 determines whether the print job is a job in which a color original is included (monochromatic pages and color pages are mixed) (S2002). If it is determined that the color/monochromatic originals are not mixed, the CPU 70 causes the monochromatic image forming apparatus 100 to print out image data if the image data is that of the monochromatic original. If the image data is that of the color original, the CPU 70 causes the color image forming apparatus 101 to print out the image data (S2005).

If it is determined in step S2002 that the color/monochromatic originals are mixed, the CPU 70 determines whether the distribution mode is set (S2003). If it is determined that the distribution mode is not set, the CPU 70 carries out a control to cause the color image forming apparatus 101 to effect printing of image data of mixed color/monochromatic pages (S2005).

If it is determined that the distribution mode is set, the CPU 70 carries out a distributive printing control to distribute the monochromatic page (image data of the monochromatic original) to the monochromatic image forming apparatus 100 and to distribute the color page (image data of the color original) to the color monochromatic image forming apparatus 101 (S2004).

When printing of all color pages has been completed (S2006), the CPU 70 confirms whether printing of all monochromatic pages has been completed (S2007). If printing of all monochromatic pages has been completed, the CPU 70 determines that the print job is completed and returns to a print job wait state (S2001).

If the printing of monochromatic pages is not completed in step S2007, the CPU 70 determines whether the high-speed printing mode is set (S2008). If the high-speed printing mode is not set, the CPU 70 continues the print control in the monochromatic image forming apparatus 100 until the printing of monochromatic pages is completed. Then, when the printing of all monochromatic pages has been completed, the CPU 70 determines that the print job is completed and returns to the print job wait state (S2001).

If the high-speed printing is set in step S2008, the CPU 70 switches the operation mode in the color image forming apparatus 101 to the monochromatic mode (S2009).

Subsequently, the CPU 70 determines whether a previous print job is being carried out (S2010), whether a jam has occurred (S2011), and whether an interrupt copying operation is being performed (S2012).

If "NO" in all of steps S2010 to S2012, the CPU 70 distributes the printing operation of monochromatic pages to the monochromatic image forming apparatus 100 and color image forming apparatus 101 in accordance with their printing speeds (monochromatic printing). For example, if the printing speed of the monochromatic image forming apparatus 100 is 40/min. and the printing speed of the color image forming apparatus 101 is 80/min., the monochromatic pages in the remaining print job are distributed with a ratio of 1:2.

If it is determined in steps S2010 to 2012 that the previous print job is being carried out, or a jam has occurred, or an interrupt copying operation is being performed in either image forming apparatus (100 or 101), the CPU 70 distributes the printing of all monochromatic pages to either of the monochromatic image forming apparatus 100 and color image forming apparatus 101, which is in the printable state (S2014).

In addition, if the error is eliminated (the completion of the previous print job, the elimination of jam, or the end of the interrupt copying operation) (S2015), the CPU 70 distributes once again the printing operation of monochromatic pages to the monochromatic image forming apparatus 100 and color image forming apparatus 101 in accordance with their printing speed ratio (S2013).

If the printing of all monochromatic pages has been completed (S2016 or S2017), the CPU 70 instructs either the monochromatic image forming apparatus 100 or color image forming apparatus 101 to print out a print result table, or instructs the personal computer 103, from which the print job was sent, to display the print result table (S2018). Then, the CPU 70 returns to the print job wait state (S2001).

FIG. 8 shows an example of a print result table printed out by either the monochromatic image forming apparatus 100 or color image forming apparatus 101, or displayed on the personal computer 103. The print result table to be displayed or printed contains a print job name, a possessor, a required print time, the number of printed copies, the printed pages, the number of printed pages, distinction of monochromatic/color, the output printer (image forming apparatus), etc.

Figure 9:
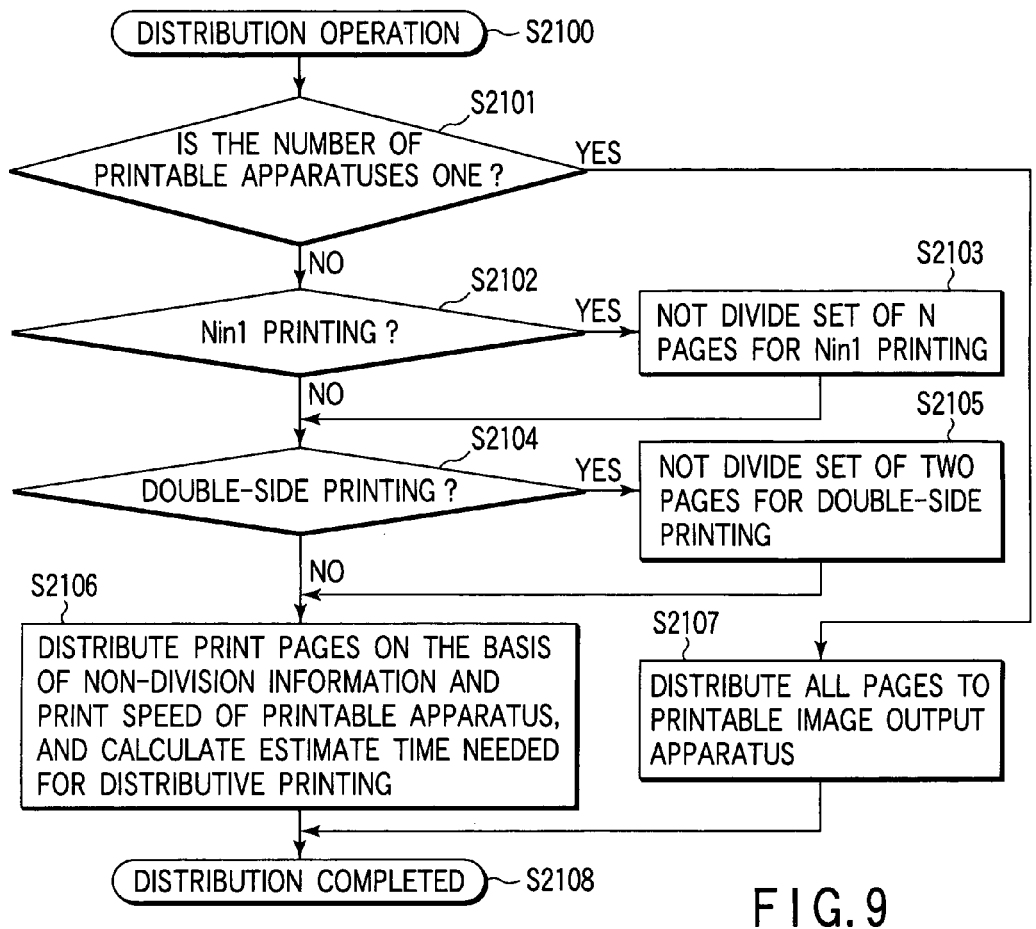
FIG. 9 is a flow chart illustrating a distributing operation.

The distribution operation of the printer controller 102 according to the present invention will now be described with reference to a flow chart of FIG. 9.

When the distribution operation is initiated (S2100), the CPU 70 of the printer controller 102 confirms whether the number of image output apparatuses (including image forming apparatuses) which are in the printable state is one or not (S2101). If the number is one, all pages are assigned to the sole image output apparatus in the printable state (S2107).

If there are a plurality of image output apparatuses in the printable state in step S2101, the CPU 70 checks whether the received print job includes Nin1 printing, in which image data of plural pages (N pages) is printed on one paper sheet (S2102). If there is the Nin1 printing, N pages for the Nin1 printing are set such that they are not divided (S2103).

The CPU 70 then confirms whether the received print job includes double-side printing (S2104). If there is double-side printing, two pages for the double-side printing are set such that they are not divided (S2105).

Based on the results in steps S2102 to S2105 and the printing speeds of the available image output apparatuses, the CPU 70 distributes pages to be printed and also estimates a time needed for the distributive printing (S2106).

For example, if the number of all pages yet to be printed is M (pages), the number of printable image output apparatuses is three and their sprinting speeds are a, b and c (ppm), the numbers of pages to be distributed are a×M/(a+b+c), b×M/(a+b+c) and c×M/(a+b+c), respectively. In this case, the approximate time needed for printing is M/(a+b+c).

If the distribution is effected in step S2106 or S2107, the CPU 70 completes the distribution operation (S2108).

Figure 10:
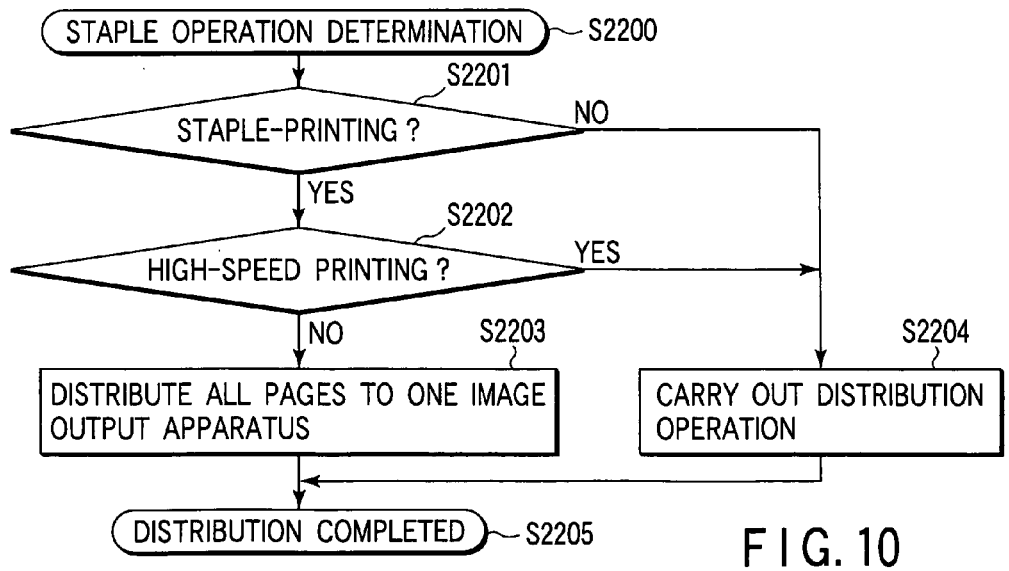
FIG. 10 is a flow chart illustrating a distributing operation where a staple-printing is set.

Referring to a flow chart of FIG. 10, a description will now be given of the distribution operation in the printer controller 102 of this invention in a case where a staple-printing is set. The staple-printing in this context refers to a print job in which a staple mode for stapling a plurality of printed-out paper sheets is set.

The CPU 70 of the printer controller 102 confirms whether the staple-printing is set in the received print job (S2201). If the staple-printing is not set, the CPU 70 performs the above-described distribution operation (S2204).

If the staple-printing is set, the CPU 70 further confirms whether the high-speed printing is set in the print job (S2202).

If the high-speed printing is not set, the CPU 70 assigns all pages to one image output apparatus in order to carry out the staple-printing (S2203).

If the high-speed printing is set, the CPU 70 cancels the staple-printing set in step S2201 and performs the above-described distribution operation (S2204).

If the assigning in step S2203 or the distribution in step S2204 is effected, the CPU 70 completes the distribution operation (S2205).

As has been described above, according to the embodiment of the present invention, the monochromatic image forming apparatus is used to print out image data of monochromatic originals and the color image forming apparatus is used to print out image data of color originals in the case of printing mixed monochromatic/color originals. However, if the color image forming apparatus has entered the idling mode, the mode of the color image forming apparatus is switched to the monochromatic mode and the color image forming apparatus is used as a monochromatic image forming apparatus. Thereby, the total printing time can be reduced.

What is claimed is:

1. An image output system including a plurality of output apparatuses, and a controller connected to the output apparatuses for controlling image outputs of the output apparatuses, wherein the controller comprises:

reception means for receiving a print job; and
control means,
the control means confirming whether the staple-printing is set in the print job received by the reception means,
the control means confirming whether high-speed printing is set in the print job, if the staple-printing is set,
the control means assigning all page images to one of the output apparatuses in order to carry out the staple-printing, if the high-speed printing is not set,
the control means canceling the staple-printing if the high-speed printing is set, and distributing image outputs to one or more of the output apparatuses which are in a printable state.

2. An image output system according to claim 1, wherein the high-speed printing is set for all or designated ones of the output apparatuses.

3. An image output system according to claim 1, wherein the control means performs control to display a print result table when printing ends in an output destination display mode, the print result table indicating which output apparatus is used for printing each of the pages.

4. An image output system according to claim 1, wherein the control means performs control to print a print result table when printing ends in an output destination print mode, the print result table indicating which output apparatus is used for printing each of the pages.

5. An image output method of outputting images using a plurality of output apparatuses connected via a network, comprising:

confirming whether the staple-printing is set in a print job;
confirming whether high-speed printing is set in the print job, if the staple-printing is set,
assigning all page images to one of the output apparatuses in order to carry out the staple-printing, if the high-speed printing is not set,
canceling the staple-printing if the high-speed printing is set, and distributing image outputs to one or more of the output apparatuses which are in a printable state.

6. An image output method according to claim 5, wherein the high-speed printing is set for all or designated ones of the output apparatuses.

7. An image output system including a plurality of output apparatuses, and a controller connected to the output apparatuses for controlling image outputs of the output apparatuses, wherein the controller comprises:

a reception section for receiving a print job; and
a control section,
the control section confirming whether staple-printing is set in the print job received by the reception section,
the control section confirming whether high-speed printing is set in the print job, if the staple-printing is set,
the control section assigning all page images to one of the output apparatuses in order to carry out the staple-printing, if the high-speed printing is not set,
the control section canceling the staple-printing if the high-speed printing is set, and distributing image outputs to one or more of the output apparatuses which are in a print-ready state.

* * * * *